Figure 1:
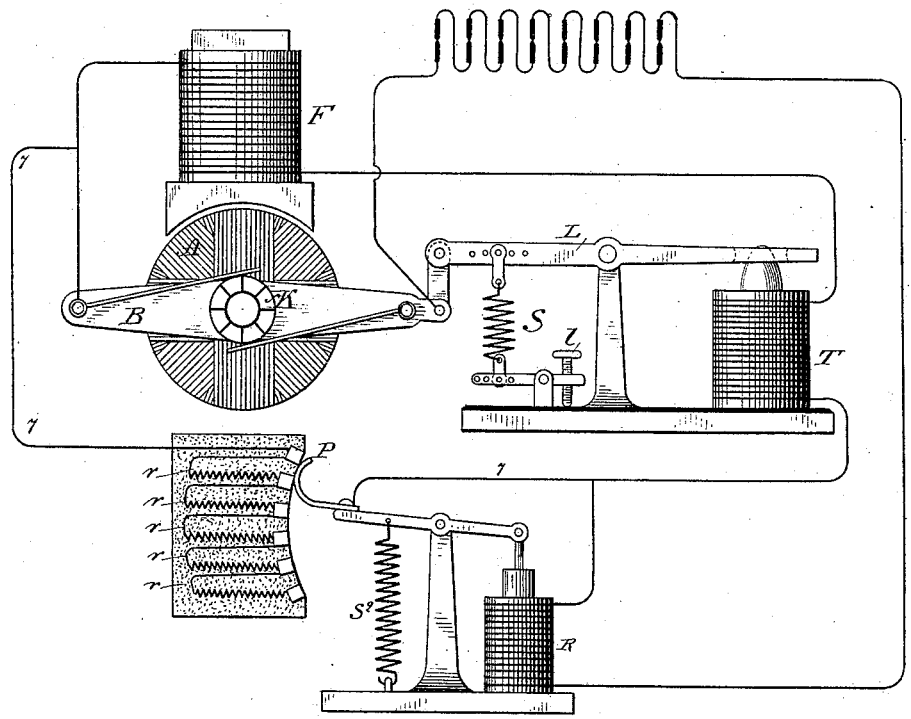

(No Model.)

2 Sheets—Sheet 1.

E. THOMSON.
REGULATOR FOR DYNAMO ELECTRIC MACHINES.

No. 302,963.  Patented Aug. 5, 1884.

Witnesses:
Ernst Abshagen
Thos. Dooney

Inventor:
Elihu Thomson
By his Attorney H. C. Townsend (No Model.)  2 Sheets—Sheet 2.

E. THOMSON.
REGULATOR FOR DYNAMO ELECTRIC MACHINES.

No. 302,963. Patented Aug. 5, 1884.

Witnesses:
Ernest Abshagen
Thos. Dooney

Inventor:
Elihu Thomson
By his Attorney: H. C. Townsend

UNITED STATES PATENT OFFICE.

ELIHU THOMSON, OF LYNN, MASSACHUSETTS, ASSIGNOR TO THE THOMSON-HOUSTON ELECTRIC COMPANY, OF CONNECTICUT.

REGULATOR FOR DYNAMO-ELECTRIC MACHINES.

SPECIFICATION forming part of Letters Patent No. 302,963, dated August 5, 1884.

Application filed February 28, 1884. (No model.)

*To all whom it may concern:*

Be it known that I, ELIHU THOMSON, a citizen of the United States, and a resident of Lynn, in the county of Essex and State of Massachusetts, have invented certain new and useful Improvements in Regulators for Dynamo-Electric Machines, of which the following is a specification.

My invention relates to regulators or governors for dynamo-electric machines of the kind in which the current is governed by changing the strength of the magnetic field in which the armature revolves, and more particularly to that class in which an adjustment of the commutator is made to take place automatically at the same time that the strength of the field is varied.

My present invention consists in an improved combination whereby an adjustment of the commutator may be made to take place at the time the strength of the magnetic field is varied, and embodies an improved method of carrying out the invention described and claimed in an application for patent filed jointly by myself and E. Wilbur Rice, January 28, 1884, Serial No. 122,309. In said application the adjustment of the commutator is effected by the same magnet that controls the strength of the magnetic field; and, further, the mechanism that imparts movement to the adjustable portion of the commutator is the same as that which imparts motion to the devices governing the strength of the current that excites the field-magnet.

My present invention consists in making the adjustment of the commutator follow, directly or indirectly, as a consequence of the operation of the field-varying device, instead of making the two operations, so to speak, coincident, as must be the case where both devices are actuated by the same mechanism. In practice the two operations are in my present invention virtually simultaneous, and in this sense the present invention constitutes simply an improved method of carrying out the prior invention; but in the present case the devices for effecting the two actions of varying the field and adjusting the commutator are independent, and the adjustment of the commutator can, from the nature of the combination, take place only in case the field-varying devices produce the electrical actions necessary to the variation of the field. In the former case the devices are mechanically connected. In the present case they are electrically dependent and mechanically independent. Owing to the latter circumstance, the two means for effecting the change of the field and the adjustment of the commutator may be regulated independently, to do their work properly. My present invention consists in the combinations, whereby the above-described actions are carried out, and likewise consists, broadly, in the combination of the adjustable commutator and a regulating-magnet or magnet-armature separate from the magnet, or the arrangement of circuits whereby the exciting-current for the field of force is varied.

In carrying out my invention I propose to use any kind of field adjustment, the general object being to automatically compensate for the change in the position of the neutral point that occurs on a change of a field by adjusting the commutator to the changed condition. As an adjustable commutator, I prefer to use one in which the brushes are shifted upon the commutator-cylinder in preference to those in which the brushes are fixed and the commutator-cylinder is shifted on its axis. In shifting the brushes I may make them follow the shifting neutral point produced by changing the strength of the field; or I may make them exceed the movement of the neutral point, so that the effect of shifting the commutator, with relation to the neutral point, shall be superadded to the effect produced by changing the strength of the field in which the armature revolves.

Some of the various ways in which my invention may be carried into practice are illustrated diagrammatically in the accompanying drawings.

Figure 2:
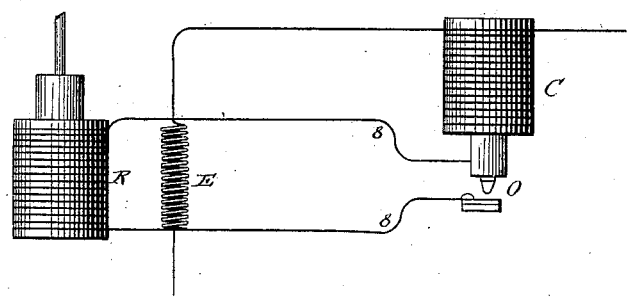
Figure 3:
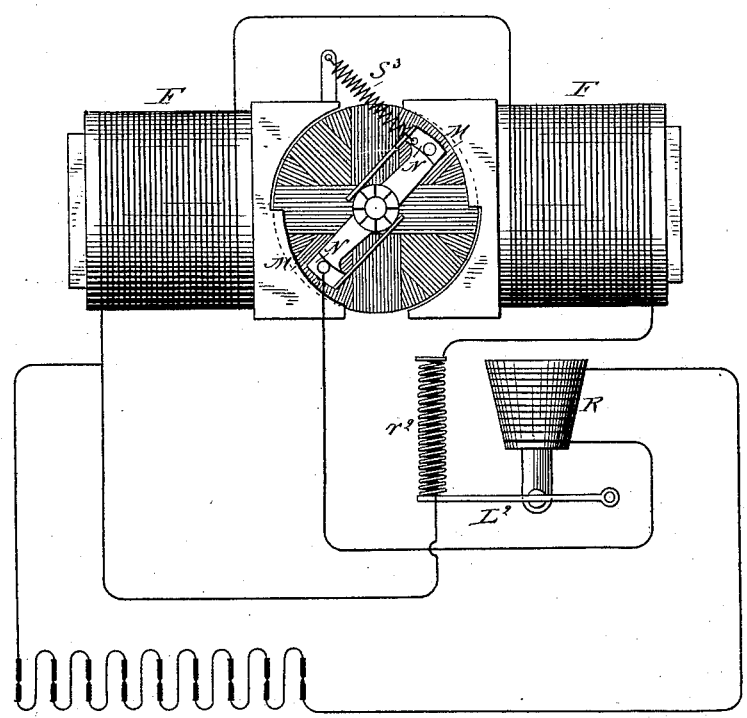

Figure 1 illustrates the combination as carried out by variably shunting the field-coils to vary the strength of the field, and by adjusting the commutator by a magnet separate from the field-magnet in the field-coil circuit or branch. Figure 2 illustrates a modified arrangement of controlling-magnets. In Fig. 3

Figure 4:
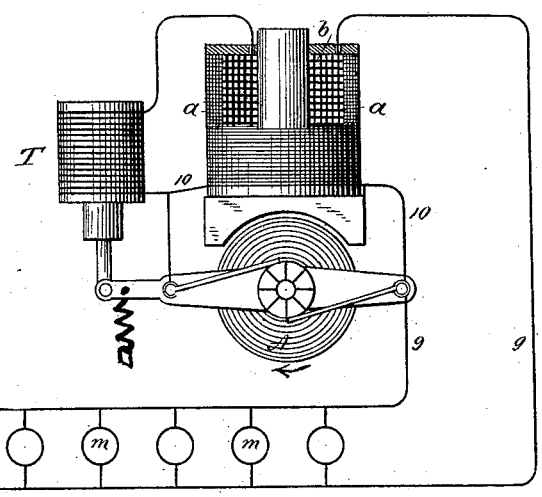

I show how the field-magnet itself may be utilized to govern the position of the commutator through the action of an armature acted upon by the field-magnet poles. Fig. 4 illustrates a modification of the invention, in which the device for varying the field consists of a fine-wire magnetizing-coil upon the field-magnet, and placed in a derived circuit of high resistance, as in compound wound machines.

Referring to Fig. 1, F indicates exciting-coils for the field-magnet of a dynamo-electric machine of any description, and A an armature revolving in the magnetic field. K indicates a commutator of any desired description, whose brushes are mounted on an adjustable yoke, B, or other suitable support. The coils F are in circuit with the armature and the working-circuit, after the usual plan, as indicated, and the strength of the field is governed by controlling the resistance in a branch, 7, around them, so as to shunt more or less current from them according as the strength of the field should be greater or less. Any other expedients might be used for this purpose—such, for instance, as the well-known one of varying the number of exciting-coils in circuit.

The variable-resistance device shown consists of the well-known one of a series of resistance-coils, $r$, a series of contacts, and an adjustable circuit-closer, P, adapted to move over the contacts and lessen or increase the number of coils in the circuit 7, according to the direction in which it moves. The adjustable resistance is controlled by any device responding to or varying with variations of working-resistance or changes of current taken from the armature. Such device may be a magnet of any desired description, either in a derived circuit of high resistance around the working-resistance, or in circuit with it, or otherwise located for the purpose. In the present case I have shown a magnet, R, in the working-circuit, and having a movable core attached to a lever carrying the circuit-closer P. Magnet R works in opposition to a suitable retractor—as, for instance, a spring, $S^2$—and, as is obvious, serves, upon a diminution of working resistance and consequent increase of current, to diminish the resistance in the shunt 7, and to thus weaken the magnetic field.

The commutator-brushes are adjusted by means of the electro-magnet T, in the circuit with the coils F, and acting upon an armature-lever, L, in opposition to a suitable retractor, S. Lever L is connected by a link with the movable yoke of the commutator-brushes. As will be obvious, when the current in the coils F and magnet T weakens, the spring S acts and moves the commutator-brushes forward in the same direction with the shifting neutral point, while if the current in F and the strength of the field increase the magnet T asserts itself and moves the brushes in an opposite direction.

In the combined operation of the field-varying and commutator-adjusting devices, the magnet R operates the variable resistance to change the strength of the field. By this operation the strength of the current in magnet T is varied, and a consequent adjustment of the commutator-brushes ensues. I prefer in practice to give the magnet T a uniform pull upon its armature in all positions of the latter for the same strength of current. This may be accomplished by making the pole of the magnet conoidal or paraboloidal in form, and employing a perforated armature, as indicated.

The retractor S is preferably adjustable in the two ways indicated, first, by shifting its point of connection to the lever L with relation to the fulcrum, so as to determine its retracting capacity; and, second, by governing its tension through a set-screw, $l$, acting on a lever to which the spring is connected. The spring may be connected to the latter lever at any desired point, so as to keep its two ends in vertical line when the point of connection of the opposite end to the lever L is shifted. The desired uniformity of pull of the magnet might be secured by other means—as, for instance, by using a movable core and placing more coils or convolutions about that end of the magnet toward which the core moves under the influence of the current on the coils.

Increased sensitiveness of action of the magnet R may be secured by the employment of a relay, C, Fig. 2, controlling-contacts O, through which a shunt, 8, around coils of R, is completed when the magnet is weakened to a predetermined extent. When the current in C increases sufficiently to open or partially open the contacts, the shunt is broken and the current then flows more strongly in R. An artificial resistance, E, is placed in a branch around the contacts O, to reduce the spark at breaking of contact, as indicated in Fig. 3. Instead of employing a separate magnet in the circuit of coils F, I may utilize the field-magnet itself for adjusting the commutator.

N N indicate a swinging armature or armatures forming or attached to the rocker-arm or yoke carrying the commutator-brushes, and M M indicate extensions from the poles of the field-magnet, projecting laterally into position to act on the armatures and turn the rocker-arm against the force of its retractor $S^3$, when the strength of the field-magnet increases. In this case, as before, when the devices for adjusting the field act to vary the strength thereof, a resultant effect of their action is an adjustment of the commutator-brushes, owing to the change in the exciting-current and consequent change in the strength of magnetic pull on the armatures N.

The adjustment of the field is in Fig. 3, as in Fig. 1, effected by shunting current from them; but the adjustable resistance through which current is shunted is of different form, and consists of a coil of wire, $r^2$, whose turns are in close proximity, and may be brought into more or less close connection by the compressing-action of a lever, $L^2$, bearing upon their end, as indicated. Lever $L^2$ carries a core for a coil, R, in the working-circuit, or otherwise connected thereto; and as the strength of the magnetic lift upon the core increases the convolutions of the coil $r^2$ are closed and the resistance in the shunt diminishes, thus diminishing the flow of exciting-current in the circuit, energizing the field, and controlling the commutator.

In Fig. 4 I have illustrated the magnet F as having a compound coil, one portion, $a$, of which is a magnetizing-coil in a derived circuit of high resistance to the main circuit, supplying current to the working-resistances $m$, arranged in multiple arc.

The main energizing-coils for the field-magnet are indicated at $b$, and in circuit with them is the magnet T, having a movable core connected to the yoke or rocker-arms carrying the commutator-brushes. The coils $a$ are suitably wound or connected, so that the current flowing in them tends to assist or add their effect to the strength of the field magnetism produced by action of coils $b$. When the number of working-resistance $m$—such, for instance, as incandescent electric lamps—decreases, the external or working resistance is increased, thus throwing less current into coils $b$ and decreasing the strength of the field by the well-known action. Such decrease is followed by a decrease in the current supplied by the armature, and there is also a consequent decrease of lifting-power upon the core of T, so that the core recedes and the commutator-brushes are adjusted backward to the direction of revolution of the armature, and in the same direction with the shifting neutral point in such machines. In this, as in the preceding cases, the action of the field-adjusting device is made a precedent to and results in an adjustment of the commutator.

Many other modifications may be made without departing from the spirit of the invention. Any devices or arrangements of devices or circuits may be used for effecting a change in the magnetic field, and any mechanical devices or arrangements of mechanical devices may be employed for effecting a commutator adjustment. The latter are, however, in order to conform to my invention, placed under the control of some magnetic or electrical device, whose action or power is controlled or made to vary, directly or indirectly, by the adjusting or operating of the field-varying devices, and as a consequence of such adjustment or operation.

What I claim as my invention is—

1. The combination, with a dynamo-electric machine having means whereby the strength of its magnetic field may be varied, of an adjustable commutator independent of the field-varying device, and an electro-responsive device for governing said commutator, said device being controlled by the variations of current attendant upon the variation of the magnetic field.

2. The combination, with a dynamo-electric machine having a variable field-magnet, of an adjustable commutator and mechanism for governing the position of said commutator, said mechanism being energized or controlled through the agency of an electric current, a change in which results from the operation of the means for varying the field.

3. The combination, in a dynamo-electric machine, of a variable field-magnet, an adjustable commutator independent of the field-varying devices, and a controlling electro-responsive device in a circuit in which current varies as a result of the operation of changing the magnetic field.

4. The combination, with a dynamo-electric machine, of an adjustable commutator, an operating electro-magnet for said commutator placed in a field-magnet circuit, so as to respond to variations of current in said field-magnet, and mechanism for varying the strength of the field, said mechanism being independent of that by which the commutator is adjusted.

5. The combination, with a dynamo-electric machine, of a variable field-magnet, mechanism for adjusting the commutator independently of the field-varying device, and a controlling-magnet therefor, whose coils are in the field-magnet circuit, as and for the purpose described.

6. The combination, with a dynamo-electric machine, of an adjustable commutator, a magnet core or armature acting on the same, and controlled by variations of current in the field-magnet circuit, and means for varying the strength of the field independent of the mechanism by which the commutator is adjusted, all as set forth, so that the adjustment of the commutator shall follow from an adjustment of the field.

7. The combination of a dynamo-electric machine having devices, substantially as described, for automatically varying the strength of its magnetic field for the purpose of maintaining a uniform current, an independent mechanism for adjusting the commutator, and a governing electro-magnet for the latter in a field-exciting circuit, as and for the purpose described.

8. The combination, with a dynamo-electric machine having a variable field-magnet, of a magnet-core or armature controlling the strength of the field, an adjustable commutator, and a separate magnet controlling the latter.

Signed at Lynn, in the county of Essex and State of Massachusetts, this 20th day of February, A. D. 1884.

ELIHU THOMSON.

Witnesses:
GEO. CUTTER,
E. WILBUR RICE.